United States Patent [19]
Lewis et al.

[11] Patent Number: 5,322,441
[45] Date of Patent: * Jun. 21, 1994

[54] METHOD AND APPARATUS FOR PROVIDING A PORTABLE VISUAL DISPLAY

[75] Inventors: Russell F. Lewis; Steven F. Martin, both of Dallas; Dale A. Cone, Garland; Norman A. Josephson, Dallas, all of Tex.

[73] Assignee: Texas Instruments Incorporated, Dallas, Tex.

[*] Notice: The portion of the term of this patent subsequent to Jan. 5, 2010 has been disclaimed.

[21] Appl. No.: 933,605

[22] Filed: Aug. 21, 1992

Related U.S. Application Data

[63] Continuation of Ser. No. 593,190, Oct. 5, 1990, abandoned.

[51] Int. Cl.$^5$ ............................................. G09B 5/00
[52] U.S. Cl. ..................................... 434/307; 434/43; 434/69; 395/152; 395/161; 33/313; 33/366; 340/686; 455/89; 364/578; 345/8; 348/121
[58] Field of Search .................... 434/38, 40, 43, 44, 434/258, 261, 307–309, 350, 69; 340/686, 689, 705; 381/190, 205; 358/93, 105, 229, 248, 213.11; 455/89; 395/127, 135, 152, 154, 155, 161; 73/379, 299, 323; 33/366, 377; 364/313, 578

[56] References Cited

U.S. PATENT DOCUMENTS

| | | | |
|---|---|---|---|
| 3,548,657 | 12/1970 | Panerai et al. | 73/293 |
| 4,154,000 | 5/1979 | Kramer | 33/366 |
| 4,281,354 | 7/1981 | Conte | 358/105 X |
| 4,310,849 | 1/1982 | Glass | 358/88 |
| 4,453,044 | 6/1984 | Murphy | 381/175 |
| 4,515,997 | 5/1985 | Stinger, Jr. | 381/190 X |
| 4,636,866 | 1/1987 | Hattori | 358/236 |
| 4,755,801 | 7/1988 | Gooley | 340/689 X |
| 4,807,202 | 2/1989 | Cherri et al. | 434/44 X |

OTHER PUBLICATIONS

"Virtual Environment Display System" by Fisher et al, ACM 1986 Workshop on Interactive 3D Graphics, Oct. 23–24, 1986.

*Primary Examiner*—Richard J. Apley
*Assistant Examiner*—Joe Cheng
*Attorney, Agent, or Firm*—W. Daniel Swayze, Jr.; Leo N. Heiting; Richard L. Donaldson

[57] ABSTRACT

There is disclosed a system and method for providing a portable visual display device. The device, in one embodiment, can be worn over the head by a viewer in the manner of a helmet. The viewer then looks at a screen within the helmet and "7 sees" created images. The helmet is equipped with sensors which determine the geographical direction as well as the relative movement of the viewer. The images are stored in a processor as a series of objects, each having associated therewith physical characteristics, including both audio and visual.

13 Claims, 2 Drawing Sheets

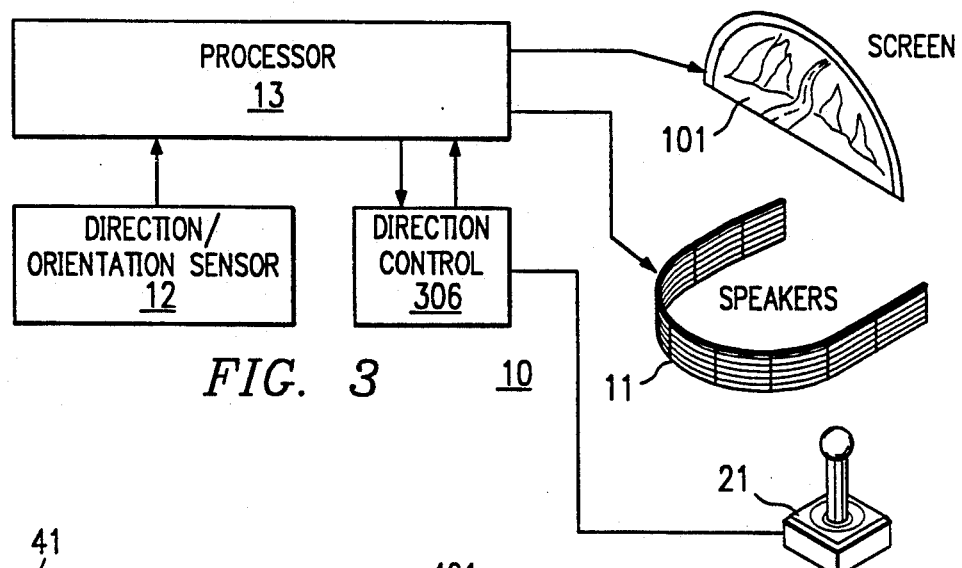
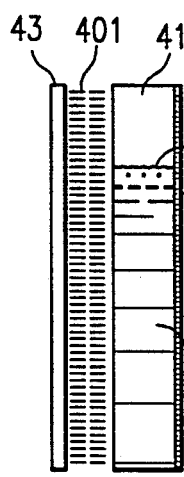
FIG. 4a
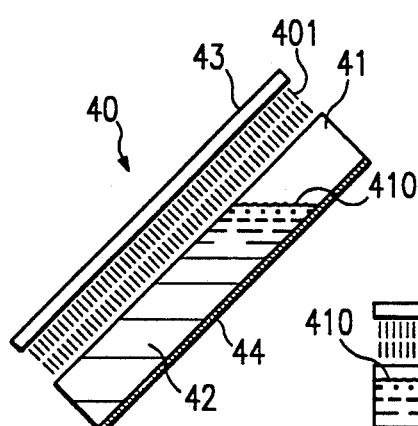
FIG. 4b
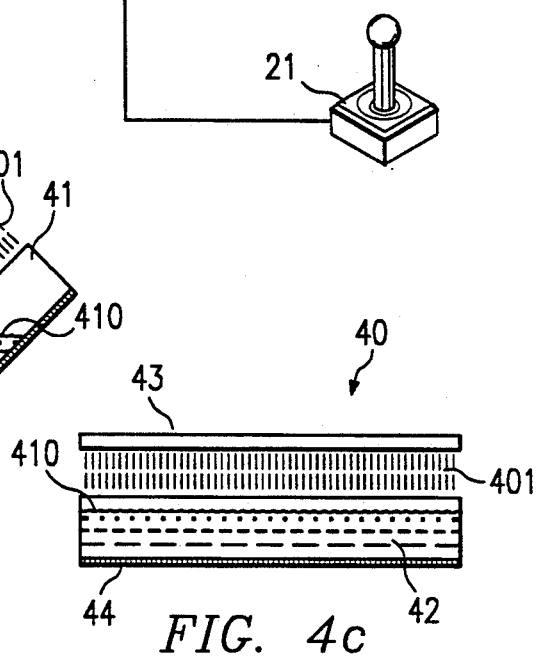
FIG. 4c
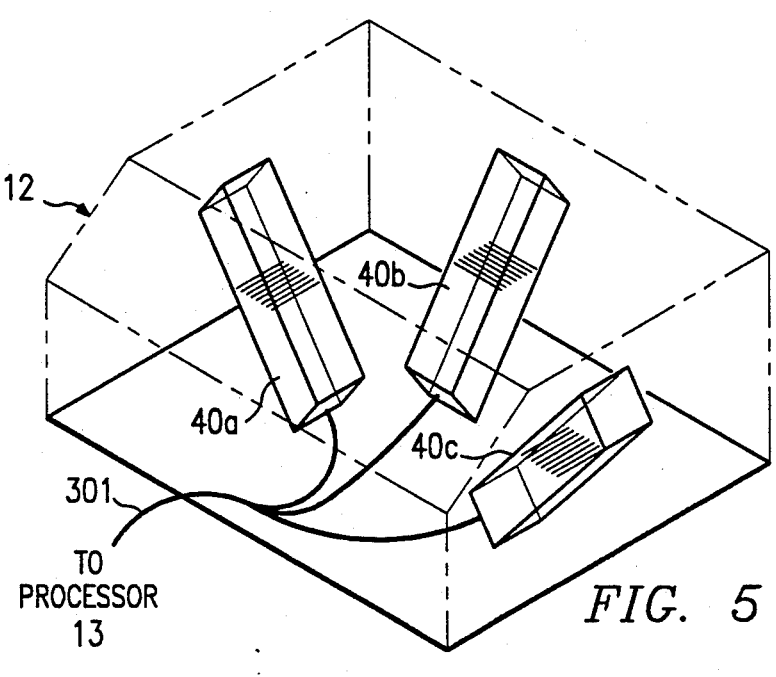
FIG. 5

METHOD AND APPARATUS FOR PROVIDING A PORTABLE VISUAL DISPLAY

This application is a continuation of application Ser. No. 07/593,190, filed Oct. 5, 1990, now abandoned.

TECHNICAL FIELD OF THE INVENTION

This invention relates to visual displays and more particularly to such displays which are easily portable and dependent upon the viewer's motion for generating the viewed images.

CROSS REFERENCE TO RELATED APPLICATIONS

The following patent applications are cross-referenced to one another, and all have been assigned to Texas Instruments Incorporated. These applications have been concurrently filed and are hereby incorporated in this patent application by reference.

| Ser. No. Filed | Title |
| --- | --- |
| 07/593,190 10/05/90 | Method and Apparatus for Providing a Portable Visual Display |
| 07/593,883 10/5/90 U.S. Pat. No. 5,177,872 | Method and Apparatus for Monitoring Physical Positioning of a User |
| 07/593,702 10/05/90 pending | Method and Apparatus for Presentation of On-Line Directional Sound |

BACKGROUND OF THE INVENTION

It is often desired to provide systems for viewers which create for the viewer an artificial environment such that the viewer can be presented with created images, for example, of a particular geographical location. This type of system is known as an artificial, or virtual, reality system.

The main idea is to build three-dimensional models of different types of objects, such as buildings, architectures, wiring diagrams, frames of things, military installations, computer chips, and view these three dimensional models on a graphics display. The display can be helmet mounted with a heads-up display or could be an LCD display or could be projected on glasses. The main point being that the viewer's field of vision is limited to only the presented three-dimensional model. The viewer can only see a certain area, and if the viewer turns his/her head right, then the view of the model changes right. If the viewer looks left, then the view shifts to the left. This creates an artificial reality around the viewer.

Such systems exist, usually for military simulation networks and aircraft training. However, typically such systems are controlled by very powerful computers and processors which, in a typical system, can cost $250,000 each. In addition to being costly, such systems are not mobile and the user is confined to a stationary, or nearly stationary, position, in proximity to the controlling system.

The relative position and altitude of a person or object is important to monitor for many reasons. For example, in an artificial reality system, it is necessary to continually determine the direction a viewer is facing, the viewer's motion and the speed of the viewer's movements.

In the past, such measurements have been made using expensive, typically bulky, equipment.

In portable artificial reality systems, light weight and economy are mandatory since, in one embodiment, the viewer wears the directional sensor on a helmet, and in other embodiments carries the directional sensors in his/her hand.

Typically, such sensors are flux gate compasses, cameras, radio wave detectors and sensors, spring loaded acceleration devices, and other sophisticated devices, usually relying on magnetic flux detection or visual imaging. Also, usually such sensors require calibration each time a user begins a session using the device.

There are many situations in which full wrap-around sound is desirable for presentation to a listener. One such system is in artificial reality systems where an artificial environment has been created for a user. This environment would typically contain scenes that are created surrounding the viewer, and as the viewer moves in any plane relative to the environment, the scene changes as it would if the viewer were moving in a real environment.

In some situations sound is presented to the viewer in conjunction with the projected images such that as the viewer (or sound source) moves closer or further away, the sound will increase or decrease in volume and frequency. At times the sound would appear to come from directly behind, over or below the listener.

Conventional stereophonic speakers which are placed over each ear can only approximate the direction of the sound from one side or the other. These speakers are expensive and do not satisfy the requirement that the listener actually hear the sound coming from behind, above, below or from one side.

Currently, surround sound or holographic sound or what is called 3-D sound, is generated by using powerful digital signal processors which are basically stereo earphones tricking the ear into perceiving that the sound is coming from behind, around, or from different distances.

Accordingly, there is a need in the art for an artificial reality system which is self-contained and portable.

There is a further need in the art for such an artificial reality system which can provide created images depending upon the direction the viewer is facing and the movement of the viewer.

There is a still further need in the art to provide such a portable artificial reality system with images which are changing depending upon the direction the viewer is facing at any instant in time and also dependent upon the viewer's motion.

There is a still further need in the art for such a system which also provides sound keyed to the displayed image. Thus, there is a need in the art for a positional sensor which is self contained, light weight and economical to manufacture.

There is a further need in the art for such a sensor which allows for positional determination and velocity calculations while still remaining portable and reliable.

There is still a further need in the art for such a sensor which requires no calibration upon initial use and which is without mechanical moving parts.

Thus, a need exists in the art for a speaker system which is lightweight, inexpensive and yet which can create the illusion of sound coming from an omnipresent direction.

There is a further need in the art for such a system which can be created and controlled by an artificial reality system and is portable and generatable under processor control.

SUMMARY OF THE INVENTION

A system and method have been devised that allows a viewer to create an artificial visual environment and then to move around in that environment as though the viewer was, in reality, present in that environment. The system includes sounds keyed to the visual display which in turn is dependent upon the viewer's geographical orientation as well as the viewer's relative movements.

In one embodiment, a helmet covers the viewer's head and eyes and the viewer can only "see" what is presented on a viewing screen within the helmet. Geographical positional sensors are used to determine the viewer's movements and geographical orientation at any point in time. The sensed data is presented to a self-contained processor which then supplies the appropriate images to the viewing screen within the helmet.

By using a battery powered unit and wearing a helmet, a user can, for example, move around within the created environment. This has applications for games or for industry when the created environment is a printed circuit board. Size can be scaled as desired and the viewer can be positioned above or below a universe if need be.

The images are stored as objects within the processor, and with each object there is included the appropriate sound bits for presentation to earphones contained within the helmet. In one embodiment, piezoelectric material is used to create omni-directional sound to more nearly duplicate the real environment.

The objects can be stored in the processor as partial images such that many different prestored files (objects) can be combined to create and continually change a given environmental scene.

Positioning of the viewer within a created system is critical. In order for the projected scene to change properly, a determination must be made as to the direction the viewer is looking or moving. The system must determine if the viewer is looking up, down, left or right, and how far away from the object the viewer is standing, and if walking through the system, how far the viewer has walked, and in what direction and at what speed.

Existing systems are based on radial devices that send very low power radio signals and then triangulate so that the system can calculate the relative movements, head tilts, etc. Data gloves and helmets based on such technology are very expensive (approximately $9,000 each).

A method and device have been devised which allows for the monitoring of a tube containing a liquid, or alternatively, a solid object, a light sensing device such as a CCD. In operation, a linear CCD array is positioned to detect light passing through the tube. As the tube is tilted from the horizontal, gravity will cause the surface of the liquid (or solid object) to move (rise or fall) with respect to the CCD sensor array, blocking the light and causing signals to be generated dependent upon the relative position of the liquid within the tube.

In one embodiment, it is a trapped air bubble within the liquid which causes a light change to occur with respect to each CCD mounted to the tube. The number of CCDs "on" or "off" at any given instant of time is integrated over a period of time to provide an indication of motion direction and speed. The CCD array can be integrally packaged with the tube or could be detachably mounted. This device is economical to manufacture, light in weight and without mechanical moving parts.

The processing, based upon the speed with which the signals from the individual CCD sensors change, calculates the positional movement of the user. There can be one such sensor for each plane of possible movement so that a system can have three, or more, such sensors for precise motion and speed determination over a wide range of possible motion.

In one embodiment, two such devices can be used to define three planes of motion. This is accomplished by measuring the highest point of the liquid and the lowest point and then calculating the angle or tilt between these points. Thus, one device can provide two dimensions.

An omnipresent sound system has been constructed using a series of discreet piezoelectric elements in a headband around the user's head. Each element is individually controllable from signals provided to it from the processor. Thus, sound can be programmed to occur at any position around the user's head.

By judiciously selecting the volume and timing of the sounds from each of the individual piezoelectric elements, the listener will have the sensation of omnipresent stereographic sound which is keyed to the scene being viewed by the viewer in the artificial reality system. The scene being viewed is, in turn, controllable by the sensed motion of the user.

Thus, for example, a user can be walking (in the artificially created environment) toward a siren (for example, a flashing light on a vehicle), and the scene of the siren source (vehicle) would be getting larger. Concurrently, the sound from the siren would become louder, and the frequency of the siren could also be changing depending upon the approach angle. Of course, the vehicle could be moving relative to the viewer and the sound would change accordingly.

The system to create this illusion of changing sound is designed to send signals to different ones of the piezoelectric elements from time to time to create the illusion of the sound moving. These sound attributes of the created environment are stored in a portable processor and provided to the viewer in conjunction with the proper scene. Thus, the system knows how far the viewer is from an object so it, in turn, knows which one of the piezoelectric elements to turn on. The system knows that as the viewer approaches to view objects, the sound should get louder. If the viewer is looking directly at an object, the sound should come from in front. The viewed objects can also have boundary boxes around them so if the viewer moves into the object, a bump can be heard. In addition, the piezoelectric devices can be made to physically vibrate, thereby creating the "feeling" of sound impacting the viewer.

Since the system is object oriented, the closer the viewer gets to an object, the more the sound will change. This is important for applications, such as military and flight simulations.

Thus, it is a technical advantage of the invention to provide an artificial reality system which is portable and which is dependent upon the geographical positioning and movement of a viewer for presentation of a created scene.

It is a further technical advantage of the invention that such portable artificial reality system has been developed which senses the viewer's continued movements and which changes the presented scene in accordance with the sensed data.

It is a still further feature of this invention that a plurality of individual systems can communicate their positional data to one another so that they each can "see" and know the position of the other.

It is a still further technical advantage of this invention that the scenes which are presented to the viewer are stored in a processor as a series of objects, each object having attributes of physical space and sound associated therewith.

It is thus one technical advantage of this invention to provide a level measuring device which is portable, light weight, economical, and without mechanical moving parts and which is capable of use without initial calibration.

It is a further technical advantage of this invention that the fluid level within a confined enclosure can be monitored to determine the direction of change and the rate of change.

Thus, it is a technical advantage of the invention to provide a sound system which is omnipresent with respect to a viewer and which is lightweight and inexpensive to manufacture.

It is a further technical advantage of this invention that such a system is designed to respond to signals provided by a portable processor and generated in conjunction with an artificial reality system to provide sound in coordination with the derived physical presentation of the environment around the viewer.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 3 is a schematic representation of a simulated reality system;

FIGS. 4a, 4b and 4c depict a CCD positionorientation sensor in various orientations; and FIG. 5 shows a three-dimensional positionorientation sensor.

DETAILED DESCRIPTION OF THE INVENTION

Figure 1:
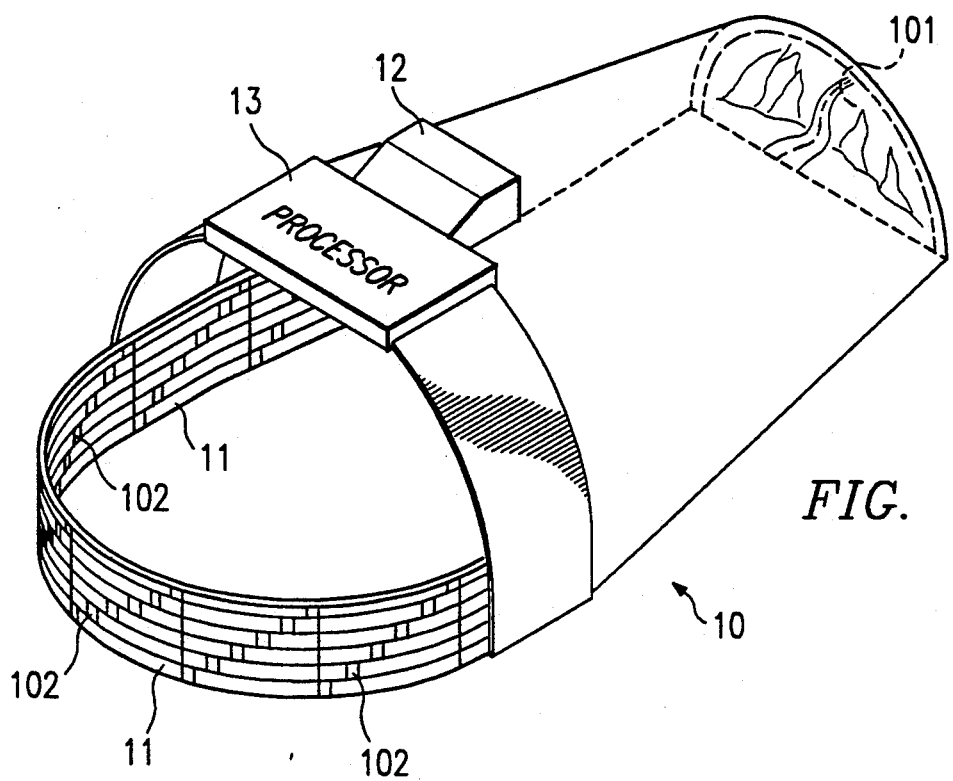
FIG. 1 is a helmet mounted virtual reality device with the speaker elements exposed.

FIG. 1 depicts a portable virtual reality system 10 worn by an individual on his or her head. System 10 consists of a color liquid crystal display screen 101, an array of piezoelectric film elements 102, a positionorientation sensor 12, transmitter-receiver 14, and a processor 13.

Processor 13 generates a visual picture according to system 10 orientation information from positionorientation sensor 12 and on board software. Processor 13 creates a three dimensional environment and projects a view of it on screen 101. As the user moves his/her head and, hence, system 10, processor 13 changes the image on screen 101 to mimic the view the user would perceive if he/she were actually in the three dimensional environment. Similarly, if the user walks or runs to a new location, processor 13 changes the image on screen 101 as if the user walked or ran the same distance and direction in the three dimensional environment.

Note that while screen 101 is a color liquid crystal display, it can be any type of display and can, for example, be positioned close to a user's eyes with a short focal length.

Processor 13 also generates a sound field through piezoelectric film elements 102 of sound band 11. Individual elements 102 are separately driven by processor 13. The processor selectively powers piezoelectric film elements 102 on an individual basis to create a directional sound field. By doing so, the processor can create the illusion of a moving sound source and of a stationary sound source when the user's head or body moves. The sound source would be stationary, i.e., the same sound would continue to come from the same elements when the user stops moving. The sound elements can be small chips or elongated bands, each driven by a separate signal from the processor.

Figure 2:
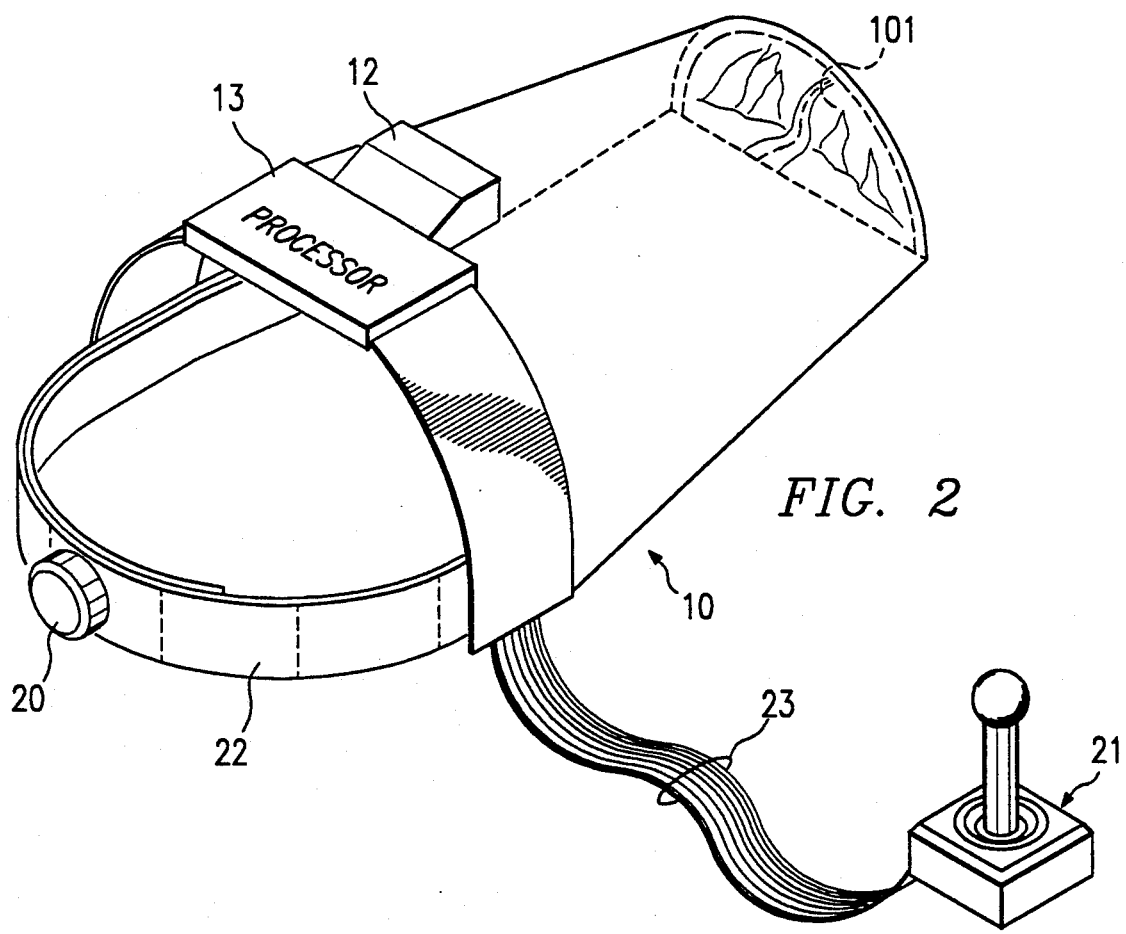
FIG. 2 is also a helmet mounted virtual reality device.

FIG. 2 shows a system in which the user, using control 21, manually changes the presented image or manually creates a change in direction or speed with respect to the created environment. Band 22 contains elements 102 and can be adjusted via tightening mechanism 20, which can also be a volume control for the elements.

FIG. 3 schematically depicts processor 13, screen 101, sound band 11, joystick 21, positionorientation sensor 12, transmitter-receiver 14, and direction control block 306. Processor 13 takes graphic information stored in a data base and generates images that are displayed on screen 101. Processor 13 also generates sound projected from piezoelectric film elements 102 found with a sound bond 11. Processor 13 could be a single processor or multiple processors such as a graphics processor from the TMS340 series and a digital signal processor from the TMS320 series, all available from Texas Instruments Incorporated. The '340 generates images shown on screen 101 and the '320 generates sound on sound band 11. Connected to processor 13 is a position-orientation sensor 12. Position-orientation sensor 12 senses the direction that the user is looking. A flux gate compass (not shown) may also be linked to processor 13 to provide absolute north-south orientation information. Direction control block 306 provides processor 13 with information indicating the user's location and view within the three dimensional environment. Direction control block 306 receives user orientation information from position-orientation sensor 12 through processor 13 and from the user directly through joystick 21. Direction control block 306 can determine the user's position within the three dimensional environment by mathematically integrating the instantaneous orientation information from position-orientation sensor 12. Transmitter-receiver 14 is used to communicate motion information from positionorientation sensor 12 to a remove receiver. The remote receiver may be another like system 10, thus allowing interaction among multiple viewers within the created environment.

FIGS. 4a, b and c depict an element in an embodiment of a position-orientation sensor 12. Assembly 40 is fluid filled and has light source 43 (or other source of electronic signals such as infrared or microwave) on one side and CCD 44 ("charge coupled device") or other electronic signal detectors on the other. Fluid 42 is maintained within a sealed chamber 41. CCD 44 is able to sense where light 401 impinges on it from source 43 and when light is blocked by fluid 42 by detecting where a substantially planar surface of a fluid level 410 lies in relation to CCD 44. FIGS. 4b and 4c depict different orientations of assembly 40 and hence depict different levels of fluid in assembly 40.

In FIG. 4b as assembly 40 is tilted down, a larger area of CCD 44 is blocked by fluid 42, allowing less light 401 to strike CCD 44. The amount of light impacting CCD 44 can be detected, for example, by using an array of individual CCD (or other detectors) devices, and monitoring, perhaps on a digital basis, the light level. When horizontal, no light gets through to CCD 44. In FIG. 4c fluid completely covers CCD 44.

In FIG. 5 a number of CCD assemblies 40 can be combined to indicate the tilt in different axes. Three assemblies, 40a, 40b and 40c are aligned along mutually orthogonal axes and encapsulated in position-orientation sensor 12 to detect motion in three dimensions. The orientation information from assemblies 40a, 40b and 40c is transmitted through cable 301 to processor 13. The CCD assemblies can also provide information on the motion and position of position-orientation sensor 12 by examining the output of CCD device over time.

It is possible to use only two devices to obtain all three orientations by taking into account the slope of liquid within each device 40.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A system for presenting artificially created environments, said system comprising:
   a presentation medium unique to a viewer for presenting to said viewer derived objects within a presented environment prepositioned at predetermined physical locations relative to said viewer;
   a position and orientation sensor for sensing motion of said viewer in relation to said presented environment, said sensor having a defined space within which a fluid is free to flow in accordance with gravity, light source means abutting and spaced along a longitudinal axis of one side of said defined space and a plurality of detectors comprising a linear CCD array abutting and spaced along said longitudinal axis of another side of said defined space for continuously monitoring an angle formed between a substantially planar surface of said free flowing fluid and said linear CCD array detectors; and
   processing circuity for creating and alerting said presented environment in response to said sensed motion of said viewer.

2. The system set forth in claim 1, wherein said derived objects are stored in said processing circuitry as attributes corresponding to physical characteristics of said derived objects.

3. The system set forth in claim 2, wherein said processing circuitry processes said stored physical characteristics of said derived objects so as to present to said viewer a visual display changing in accordance with a changing motion of said viewer.

4. The system set forth in claim 1, wherein said system further comprises:

circuitry for communicating said sensed motion to a remote receiver, and
   circuitry for receiving from said remote receiver data for presentation to said viewer.

5. The system set forth in claim 4, wherein said remote receiver is one of a plurality of systems for presenting artificially created environments.

6. The system set forth in claim 1, wherein said linear CCD array detectors are sensitive to light passing through said defined space and modified by said fluid moving within said defined space.

7. The system set forth in claim 1, wherein said system further comprises a plurality of discrete vibratory elements placed circumferentially around said viewer, said vibratory elements being operable to produce sound waves in response to impulse signals from said processing circuitry.

8. The system set forth in claim 7, wherein said processing circuitry creates and alters sound characteristics of said derived objects by individually controlling said vibratory elements in response to said motion by said viewer such that said sound characteristics of said derived objects approximate a sound level and a sound source perceived by said viewer within said presented environment.

9. A method for operating a system for presenting artificially created environments to a viewer, comprising the steps of:
   creating a presented environment and derived objects therein;
   presenting said derived objects within said presented environment to the viewer;
   introducing a fluid movable in response to motion of the viewer, wherein said fluid being movable within a defined space of a position and orientation sensor;
   spacing light source means abutting and along a longitudinal axis of one side of said defined space;
   spacing a plurality of detectors comprising a linear CCD array abutting and spaced along said longitudinal axis of another side of said defined space;
   continuously measuring an angle formed between a substantially planar surface of said fluid with respect to said CCD array of detectors to detect motion of the viewer; and
   alerting said presented environment in response to a change in said detected motion of the viewer.

10. The method set forth in claim 9, wherein said method further comprises the steps of:
    generating sounds corresponding to said derived objects; and
    altering a level and a source of said sounds in response to a change in said detected motion of the viewer.

11. The method set forth in claim 9, wherein said method further comprises the step of storing said derived objects in a processor, said derived objects having physical and sound characteristics associated therewith.

12. The method set forth in claim 9, wherein said method further comprises the steps of:
    transmitting said detected motion to a remote receiver, and receiving data from said remote receiver for presentation to the viewer.

13. The method set forth in claim 12, wherein said method further comprises the step of presenting artificially created environments to viewer by a plurality of other systems of said remote receiver.

* * * * *